United States Patent

Corbin et al.

[11] Patent Number: 5,827,492
[45] Date of Patent: Oct. 27, 1998

[54] HYDROGEN CHLORIDE PURIFICATION PROCESS

[75] Inventors: David R. Corbin, West Chester; Barry Asher Mahler, Glen Mills, both of Pa.

[73] Assignee: E. I. du Pont de Nemours and Company, Wilmington, Del.

[21] Appl. No.: 481,516

[22] PCT Filed: Jan. 28, 1993

[86] PCT No.: PCT/US93/00455

§ 371 Date: Jul. 26, 1995

§ 102(e) Date: Jul. 26, 1995

[87] PCT Pub. No.: WO94/16988

PCT Pub. Date: Aug. 4, 1994

[51] Int. Cl.[6] ............................ C01B 7/07; B01D 53/00
[52] U.S. Cl. ............................................ 423/488; 95/901
[58] Field of Search ..................... 423/488; 95/237, 95/901, 902, 903

[56] References Cited

U.S. PATENT DOCUMENTS

| | | | |
|---|---|---|---|
| 3,197,942 | 8/1965 | Haisty et al. | 95/902 |
| 3,446,586 | 5/1969 | Young | 23/154 |
| 4,009,214 | 2/1977 | Sze et al. | 260/653.7 |
| 4,010,017 | 3/1977 | Loyless | 62/28 |
| 4,018,880 | 4/1977 | Correia et al. | 423/488 |
| 4,035,473 | 7/1977 | Urioste et al. | 423/488 |
| 4,065,513 | 12/1977 | Miller | 260/656 R |
| 4,128,626 | 12/1978 | Merchant | 423/488 |
| 4,762,537 | 8/1988 | Fleming et al. | 95/902 |
| 4,766,260 | 8/1988 | Manzer et al. | 570/168 |
| 4,820,318 | 4/1989 | Chang et al. | 95/903 |
| 4,902,312 | 2/1990 | Chang | 95/131 |
| 5,036,036 | 7/1991 | Lerou | 502/317 |
| 5,261,948 | 11/1993 | Foley et al. | 95/903 |
| 5,417,742 | 5/1995 | Tamhankar et al. | 95/903 |

FOREIGN PATENT DOCUMENTS

| | | |
|---|---|---|
| 3-099026 | 4/1991 | Japan . |
| 37-11651 | 8/1992 | Japan . |
| 856664 | 12/1960 | United Kingdom . |
| 1040989 | 9/1966 | United Kingdom . |
| 1090521 | 11/1967 | United Kingdom . |
| 1379793 | 1/1975 | United Kingdom . |

OTHER PUBLICATIONS

Szostak, R., *Molecular Sieves: Principles of Synthesis and Identification*, p. 2, (1989) (no month).
Kuroda et al, *Chemical Abstracts*, 116(12), Abstract No. 109518q (1992) (no month).
Abstracts JP 32–65503, Nov. 26, 1991.

*Primary Examiner*—Michael Lewis
*Assistant Examiner*—Stuart L. Hendrickson

[57] ABSTRACT

A process is disclosed for purifying an impure HCl containing at least one saturated or olefinic impurity of the formula $C_aH_bCl_cF_d$ (wherein a is an integer from 1 to 4, b and c are each integers from 0 to 9, and d is an integer from 1 to 10; provided $b+c+d=2a+2$ for acyclic compounds and $b+c+d=2a$ for cyclic compounds and olefinic compounds) which comprises the step of contacting the impure HCl with a sorbent for said impurities selected from activated carbons and inorganic molecular sieves (e.g., silicalites and zeolites) at a temperature and a pressure suitable for sorption for a period of time sufficient to remove a substantial amount of said impurities.

19 Claims, No Drawings

HYDROGEN CHLORIDE PURIFICATION PROCESS

FIELD OF THE INVENTION

This application is a national filing under 35 USC 371 of International Application No. PCT/US93/00455 filed Jan. 28, 1993.

This invention relates to purifying hydrochloric acid and more particularly, to the purification of impure hydrochloric acid containing halogenated hydrocarbon impurities.

BACKGROUND

Hydrogen chloride, anhydrous or in aqueous solution as hydrochloric acid, is commercially valuable product which has a wide variety of uses.

Hydrogen chloride is a by-product in the preparation of fluorinated aliphatic hydrocarbons. These include fluorocarbons produced by the reaction of hydrogen fluoride with chlorinated derivatives and also fluorocarbons produced by the hydrogenolysis of chlorinated derivatives. For example, Japanese Kokai No. 3-99026 discloses the catalytic reaction of $CClF_2CF_3$ (CFC-115) with hydrogen to produce $CHF_2CF_3$ (HFC-125). For each mole of HFC-125 produced, one mole of HCl is also formed. U.S. Pat. No. 4,766,260 discloses the preparation of $CHCl_2CF_3$ (HCFC-123) and $CHClFCF_3$ (HCFC-124) by the reaction of HF and a tetrahaloethylene containing at least one chlorine atom. In addition to HCl which is produced as one mole of HCl per atom of chlorine replaced by fluorine, $CHF_2CF_3$ (HFC-125) is formed in amounts varying from 0.5% to 10% depending on the catalyst used. U.S. Pat. No. 5,036,036 discloses the preparation of CFC-115 and $CF_3CF_3$ (FC-116) by the reaction of HF and $CCl_3CF_3$ (CFC-113) over a chromium oxide catalyst. Typically, product mixtures from these processes are distilled to provide a number of fractions. Normally, HCl containing halogenated hydrocarbon impurities may be obtained as a result of such distilling.

Various methods have been used to remove organic impurities from anhydrous HCl, including absorption with a solvent; liquefaction and distillation; oxidation or combustion; and chemical reaction of the impurities followed by either sorption or distillation. The most common method of purification is by distillation. However, some of the halogenated hydrocarbon impurities occasionally exhibit vapor-liquid equilibrium (i.e., VLE) pinch points and are near azeotropes with HCl; and distillation is not practical for separating trace amounts of halogenated hydrocarbons from the hydrogen chloride.

Both carbon based and zeolite based sorbents have been proposed for various separations. The effectiveness of separation with either sorbent varies with the chemical components and the sorbents involved. The successful design of sorbent based systems is considered highly dependent upon experimental determination of whether the relative sorbencies of the particular compounds are suitable for such systems. U.S. Pat. No. 4,902,312 discloses a method for removing HF and HCl from chlorofluorocarbons using certain carbon molecular sieves to remove these acids from the chlorofluorocarbons.

SUMMARY OF THE INVENTION

We have found that saturated and olefinic halogen substituted organic impurities of the formula $C_aH_bCl_cF_d$, wherein a is an integer from 1 to 4, b is an integer from 0 to 9, c is an integer from 0 to 9 and d is an integer from 1 to 10, provided that b+c+d equals 2a+2 for acyclic compounds and equals 2a for cyclic compounds and for olefinic compounds, can be substantially removed from impure hydrogen chloride containing said organic impurities by using a sorbent for said impurities selected from the group consisting of activated carbons and inorganic molecular sieves (e.g., silicalites and zeolites). The present invention provides a process for purifying impure hydrogen chloride containing at least one impurity of said formula which comprises the step of contacting the impure hydrogen chloride containing said halogen substituted organic impurities with said sorbent at a temperature within the range of $-20°$ C. to $300°$ C. and a pressure within the range of 10 kPa to 3000 kPa for a period of time sufficient to remove a substantial amount of said halogen substituted organic impurities.

DETAILS OF THE INVENTION

The present invention provides for the separation of halogen substituted organic impurities such as $CClF_2CF_3$ (CFC-115) and $CHF_2CF_3$ (HFC-125) from impure hydrogen chloride. A process is provided in accordance with this invention for providing high purity hydrogen chloride which comprises the step of contacting hydrogen chloride containing organic impurities with a sorbent, selected from the group consisting of activated carbons and inorganic molecular sieves at a temperature and pressure suitable for sorption, for a period of time sufficient to remove a substantial amount of the impurities. The impure HCl to be purified by this process commonly contains about 2 mole percent or less halogen substituted organic impurities, and preferably contains about 1 mole percent or less halogen substituted organic impurities.

Impure HCl containing organic impurities may result, for example, from a process involving the reaction of the CFC-114 isomers (i.e., $CClF_2CClF_2$ and $CCl_2FCF_3$) with hydrogen. Distillation is typically used in order to remove impurities such as HF and almost all of the organic products to produce HCl of at least 98 mole % purity. Further purification by this invention then may be advantageously employed. Contact with sorbent should be sufficient to achieve the desired degree of HCl purity. Preferably, the mole fraction of impurity is reduced at least about 50%. Preferably, the purified HCl contains less than about 50 ppm of halogen substituted organic impurities, and most preferably, the recovered HCl contains less than about 5 ppm of halogen substituted organic impurities.

Some embodiments of this invention use activated carbon as the sorbent. Commercially available activated carbon may be used. The effectiveness of the process can be influenced by the particular activated carbon employed. Moreover, the sorption efficiency and sorption capacity of an activated carbon bed depends upon the particle size of an activated carbon in a dynamic flow system. Preferably, the activated carbon has a particle size range of from about 4 to 325 mesh (from about 0.044 to 4.76 millimeters). More preferably, the activated carbon has a particle size range of from about 6 to 100 mesh (from about 0.149 to 3.36 millimeters). Most preferably, the activated carbon has a particle size range of from about 10 to 30 mesh (from about 0.595 to 2.00 millimeters).

An activated carbon obtained having a particle size range of about 0.074×0.297 millimeters (50×200 mesh) is available from the Barneby & Sutcliffe Corp. as Activated Carbon Type UU (natural grain, coconut shell based). An activated carbon having a particle size range of about 0.450×1.68 millimeters (12×38 mesh) is available from Barnebey & Sutcliffe Corp. as Barneby & sutcliffe Corp. Activated Carbon Type PE (natural grain, coconut shell carbon). An activated carbon having a particle size range of about 0.297×0.841 millimeters (20×50 mesh) is available from Westvaco as Microporous Wood-Base Granular Carbon.

In a preferred embodiment the activated carbon contains alkali or alkaline earth metal(s) selected from the group consisting of lithium, sodium, potassium, rubidium, cesium, magnesium, calcium, strontium and barium or combinations thereof.

Some embodiments of this invention use inorganic molecular sieves. Molecular sieves are well known in the art and are defined in R. Szostak, Molecular Sieves—Principles of Synthesis and Identification, Van Nostrand Reinhold (1989) page 2. The inorganic molecular sieves used in this invention include silicas (e.g., silicalites and zeolites), metalloaluminates and aluminophosphates, as well as other inorganic molecular sieve materials. The molecular sieves useful in the invention will typically have an average pore size of from about 0.3 to 20 nanometers (nm), more typically from about 0.3 to 1.5 nm. In a preferred embodiment the inorganic molecular sieves are low aluminum content sieves such as ultra-stable Y where the Si:Al atomic ratio is equal to or greater than 3.8:1.

Suitable temperature ranges for sorption using inorganic molecular sieves range from about −20° C. to about 300° C. Suitable pressures for sorption range from about 10 kPa to about 3000 kPa.

This invention can be practiced with the sorbent contained in a stationary packed bed through which the process stream whose components need separation is passed. Alternatively, it can be practiced with the sorbent applied as a countercurrent moving bed or as a fluidized bed where the sorbent itself is moving. It can be applied with the sorbent contained as a stationary packed bed but the process configured as a simulated moving bed, where the point of introduction to the bed of the process stream requiring separation is changed (e.g., by using appropriate switching valves).

The production of purified hydrogen chloride may be accompanied by the production of other products which are enriched with regard to the concentration of one or more of the components of the initial mixture. Products enriched with respect to the impurities are typically obtained by desorption following HCl purification. Desorption of components held by the sorbent may be effected with the sorbent left in place, or the sorbent may be removed and the desorption effected remotely from where the sorption step occurred. These desorbed components may exit the sorbent section in a direction either co-current (in the same direction as the original stream requiring separation was fed) or countercurrent (in the opposite direction of the original stream requiring separation). Such desorption may be effected with or without the use of a supplemental purge liquid or gas flow, this purge material being any one of the component materials, or some appropriate alternative material, similarly fed either co-currently or countercurrently.

In general, desorption can be effected by changing any thermodynamic variable which is effective in removing the sorbed components from the sorbent. For example, sorption and desorption may be effected using a thermal swing cycle (e.g., where after a period of sorption, the sorbent is heated externally through the wall of the vessel containing it, and/or by the feeding of a hot liquid or gas into the sorbent, the hot gas being either one of the component materials or alternative materials). Alternatively, the trace components can be removed by using a pressure swing cycle or vacuum swing cycle (e.g., where after a period of sorption, the pressure is sufficiently reduced, in some embodiments to a vacuum, such that sorbed components are desorbed). Alternatively, the sorbed components can be removed by use of some type of stripping gas or liquid, fed co-currently or countercurrently to the original process feed material. The stripping material may be one of the process feed materials or another material such as nitrogen.

One or several beds of sorbent may be used. Where several beds are used they may be combined in series or in parallel. Also, where several beds are used, the separation efficiency may be increased by use of cycling zone sorption, where the pressure and or the temperatures of the beds are alternately raised and lowered as the process stream is passed through.

Practice of the invention will be further apparent from the following non-limiting Examples.

EXAMPLE 1

A packed bed (0.84 in (2.1 cm) I.D. by 18 in (48 cm) long) containing 81 grams of commercially available Calgon BPL activated carbon which was previously exposed to HCl was purged with nitrogen at 250° C. for 12 h at 300 sccm ($5 \times 10^{-6}$ m$^3$/s). The temperature was lowered to 100° C., and a gas mix of 1 wt % chloropentafluoroethane (CFC-115) in HCl was fed to the bed under 15 atm. (1520 kPa) pressure and at 0.26 grams per minute. The results are shown in Table 1.

TABLE 1

| Time Elapsed (min.) | $C/C_o$[a] HFC-115 |
|---|---|
| 0 | — |
| 36 | HCl breakthrough |
| 109 | 0 |
| 110 | 0.008 |
| 121 | 0.079 |
| 130 | 0.240 |
| 140 | 0.560 |
| 149 | 0.840 |
| 161 | 0.980 |

[a]$C/C_o$ represents the instantaneous concentration of CClF$_2$CF$_3$ in the HCl exiting the column, expressed as multiples of the 1 wt % CFC-115 in the HCl feed (e.g., 0.5 would equal 0.5 wt % CFC-115 in the HCl effluent). A zero (0) indicates less than 5 ppm CFC-115.

After 9.7 grams had been fed, organic free HCl (less than 5 ppm organics) began to exit the other end of the bed. After 18.8 grams of organic free HCl exited the bed, CFC-115 began to appear in the effluent. The concentration of CFC-115 in the effluent gradually increased, reaching 0.98 of the feed in concentration after a total of 33 grams of HCl exited the bed. The bed was then absorbed of the HCl and CFC-115 using first a thermal cycle, where the temperature was raised to 227° C., during which time 6.6 grams of HCl containing an average of 1.2 wt % CFC-115 eluted as the pressure developed was vented to keep the pressure at 15 atmospheres. The remaining HCl and CFC-115 was further reduced by stripping the bed with nitrogen at 250° C., and the sorption cycle begun again.

EXAMPLE 2

A packed bed (0.84 in (2.1 cm) I.D. by 18 in (48 cm)long) containing 81 grams of commercially available Calgon BPL activated carbon which was previously exposed to HCl was purged with nitrogen at 250° C. for 12 h at 300 sccm ($5 \times 10^{-6}$ m³/s). The temperature was lowered to 100° C., and a gas mix of 1 wt % pentafluroethane (HFC-125) in HCl was fed to the bed under 15 atm. (1520 kPa) pressure and at 0.26 grams results are shown in Table 2.

TABLE 2

| Time Elapsed (min.) | $C/C_o$[b] HFC-125 |
|---|---|
| 0 | — |
| 38 | HCl breakthrough |
| 65 | 0 |
| 75 | 0.15 |
| 79 | 0.36 |
| 85 | 0.74 |
| 89 | 0.90 |
| 96 | 0.99 |

[b]$C/C_o$ represents the instantaneous concentration of $CHF_2CF_3$ in the HCl exiting the column, expressed as multiples of the 1 wt % HFC-125 in the HCl feed (e.g., 0.5 would equal 0.5 wt % HFC-125 in the HCl effluent). A zero (0) indicates less than 5 ppm HFC-125.

After 33.5 grams had been fed, organic free HCl (less than 5 ppm organics) began to exit the other end of the bed. After 21 grams of organic free HCl exited the bed, HFC-125 began to appear in the effluent. The concentration of HFC-125 in the effluent gradually increased, reaching 0.99 of the feed in concentration after a total of 47.5 grams of HCl exited the bed.

EXAMPLE 3

This is an example of a combined thermal/pressure swing cycle with countercurrent purge during the desorption step. A sorption bed with a 0.527 in (1.34 cm) inner diameter and a 1 ft (30.5 cm) length was packed with 25.75 grams of Calgon BPL activated carbon which had previously been in contact with HCl vapors. The bed was purged with nitrogen at a temperature of approximately 200° C. to remove all traces of either organic or HCl. The bed was cooled to the run temperature of 50° C., and pressurized with nitrogen to 200 psig (1480 kPa) prior to beginning the flow of HCl/organic feed. The column was then fed a mixture containing $2.3 \times 10^{-3}$ moles $CHF_2CF_3$ (HFC-125) per mole of HCl, at a rate of $1.84 \times 10^{-3}$ moles/min. The results are shown in Table 3.

TABLE 3

| Time Elapsed (min.) | $C/C_o$[c] HFC-125 |
|---|---|
| 0 | — |
| 10 | HCl breakthrough |
| 24 | 0 |
| 120 | 0.009 |
| 134 | 0.039 |
| 141 | 0.195 |
| 150 | 0.528 |
| 159 | 0.890 |
| 171 | 0.983 |
| 180 | 0.983 |
| 185 | 1.000 |

[c]$C/C_o$ represents the instantaneous concentration of $CHF_2CF_3$ in the HCl exiting the column, expressed as multiples of the HFC-125 in the HCl feed (e.g., 1.000 would equal $2.3 \times 10^{-3}$ moles HFC-125 per mole of HCl in the HCl effluent). A zero (0) indicates less than 5 ppm HFC-125.

The saturation loadings were calculated: the HCl loading was $6.88 \times 10^{-3}$ g moles HCl/g carbon and the HFC-125 loading was $2.2 \times 10^{-5}$ g mole/g carbon.

When the outlet concentration of HFC-125 matched that of the inlet concentration the feed flow to the bed was stopped. The bed pressure was slowly lowered from 200 psig (1480 kPA) to 100 psig (791 kPa), after which the bed temperature was raised from 50° to 200° C. Gas was allowed to leave the bed in a direction opposite that of the feed. Approximately 0.13 moles of HCl and 0.00033 moles of HFC-125 were withdrawn from the bed during these two steps. At this point a purge with pure HCl was began. The purge had the same flow rate but opposite flow direction of the feed gas. The results obtained at 200° C. are shown in Table 4.

TABLE 4

| Time Elapsed (min.) | $C/C_o$[c] |
|---|---|
| 10 | 0.817 |
| 32 | 1.320 |
| 50 | 1.646 |
| 70 | 2.096 |
| 90 | 1.647 |
| 122 | 0.769 |
| 130 | 0.805 |
| 152 | 0.388 |
| 170 | 0.052 |
| 190 | 0.029 |
| 210 | 0.023 |
| 220 | 0.017 |

[c]See footnote c, Table 3

At this point the bed contained essentially pure HCl. The bed was cooled back to 50° C., then pressurized to 200 psig (1480 kPa) with pure HCl. Another sorption was run, under the same conditions as were used in the case where the bed had initially been saturated with nitrogen. The results at 50° C. are shown in Table 5.

TABLE 5

| Time Elapsed (min.) | $C/C_o$[c] |
|---|---|
| 12 | 0.000 |
| 30 | 0.010 |
| 49 | 0.022 |
| 69 | 0.011 |
| 90 | 0.000 |
| 111 | 0.000 |
| 131 | 0.033 |
| 151 | 0.461 |
| 170 | 0.944 |
| 179 | 1.003 |

[c]See footnote c, Table 3

EXAMPLE 4

This is an example of the sorption portion for an overall sorption process such as temperature and/or pressure-swing adsorption. The sorption bed had an inner diameter of 2.13 cm and a length of 48 cm, and contained 113.6 grams of silicalite pellets (Silicalite S-115 (Union Carbide) ⅛" (0.32 mm) pellets ($SiO_2$ bonded)) was used.

The bed was initially purged with nitrogen at a temperature of approximately 250° C. The bed was cooled to the run temprature of 100° C., and pressurized with nitrogen to 200 psig (1480 kPa) prior to beginning the flow of HCl/organic feed. The column was then fed a mixture of containing $2.3 \times 10^{-3}$ moles HFC-125 per mole HCl, at a rate of $7.36 \times 10^{-3}$ moles/min. The composition of the effluent from the bed at 100° C. was sampled at regular intervals, with the results shown in Table 6.

TABLE 6

| Time Elapsed (min.) | $C/C_o$[c] HFC-125 |
|---|---|
| 0 | 0.000 |
| 22 | HCl Breakthrough |
| 29 | 0.000 |
| 49 | 0.011 |
| 59 | 0.031 |
| 70 | 0.121 |
| 79 | 0.265 |
| 89 | 0.367 |
| 98 | 0.572 |
| 109 | 0.793 |
| 119 | 0.902 |
| 130 | 0.982 |
| 135 | 1.065 |

[c]$C/C_o$ See footnote c, Table 3

This equilibrium loading on the bed for HCl was $1.33 \times 10^{-3}$ moles/gram sorbent, while that for HFC-125 was $1.75 \times 10^{-5}$ moles/g.

EXAMPLE 5

This example is under conditions identical to those of Example 4, except that the operating temperature was 50° C. rather than 100° C. Results at 50° C. are shown in Table 7.

TABLE 7

| Time Elapsed (min.) | $C/C_o$[c] HFC-125 |
|---|---|
| 29 | HCl Breakthrough |
| 59 | 0.008 |
| 69 | 0.022 |
| 78 | 0.054 |
| 89 | 0.125 |
| 99 | 0.247 |
| 108 | 0.402 |
| 117 | 0.590 |
| 127 | 0.809 |
| 136 | 0.945 |
| 141 | 0.989 |

[c]$C/C_o$ See footnote c, Table 3

The saturation loading on the bed for HCl was $3.5 \times 10^{-3}$ moles/gram sorbent, while that for HFC-125 was $1.5 \times 10^{-5}$ moles/gram sorbent.

Based on the results of Examples 4 and 5, it is concluded that a thermal swing cycle could be practiced.

EXAMPLE 6

This is an example of the sorption portion for an overall sorption process such as a temperature and/or pressure swing sorption.

A sorbent bed consisting of 54.04 grams (dry) of silicalite pellets (Silicalite S-115 (Union Carbide), 1/8" (0.32 mm) pellets ($SiO_2$ bonded)) was used. The bed was contained in a 3/4" (1.9 cm) O.D. stainless steel tube (I.D.=0.62" (1.6 cm)) that was 14" (35.6 cm) long. The package section of the sorbent bed was approximately 13.5" (34.3 cm) long.

The feed contained 0.23 wt. % $CClF_2CF_3$ (CFC-115) in HCl. The experiment was run at 100° C. and 200 psig (1480 kPa). The bed was initially saturated with nitrogen at the run conditions. Feed was then introduced to the bed at rate of $4.09 \times 10^{-3}$ gmol/min, and the concentration of the effluent was monitored via gas chromatography in order to observe the breakthrough of the CFC-115 impurity. A flowmeter on the exit stream was used to indicate when HCl breakthrough occurred. The composition of the effluent from the bed at 100° C. was sampled at regular intervals, with the results shown in Table 8.

TABLE 8

| Elapsed time (min.) | CFC-115 $C/C_o$[d] | Exit/Feed Rate HCl[e] |
|---|---|---|
| 3 | 0 | 0 |
| 42 | 0 | 0 |
| 70 | HCl Breakthrough | 0.56 |
| 80 | 0 | 0.79 |
| 84 | 0 | 0.98 |
| 87 | 0 | 1.00 |
| 115 | 0 | 1.00 |
| 147 | 0.010 | 1.00 |
| 189 | 0.103 | 1.00 |
| 206 | 0.205 | 1.00 |
| 220 | 0.325 | 1.00 |
| 231 | 0.430 | 1.00 |
| 238 | 0.503 | 1.00 |
| 248 | 0.607 | 1.00 |
| 262 | 0.723 | 1.00 |
| 273 | 0.805 | 1.00 |
| 290 | 0.901 | 1.00 |
| 297 | 0.929 | 1.00 |

[d]$C/C_o$ represents the instantaneous concentration of $CClF_2CF_3$ in the HCl exiting the column expressed as multiples of the 0.23 wt % CFC-115 in the HCl feed (e.g., 0.5 would equal 0.115 wt % CFC-115 in the HCl effluent).
[e]Exit/Feed Rate HCl represents the ratio of the HCl molar flow exiting the column divided by the molar flow of HCl feed to the column.

The saturation loading on the bed for HCl was $5.24 \times 10^{-3}$ moles/gram sorbent, while that for CFC-115 was $4.13 \times 10^{-5}$ moles/gram sorbent.

Particular aspects of the invention are illustrated in the examples. Other embodiments of the invention will become apparent to those skilled in the art from a consideration of the specification or practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the claims.

What is claimed is:

1. A process for purifying impure hydrogen chloride of at least 98 mole % purity and containing at least one saturated or olefinic impurity of the formula $C_aH_bCl_cF_d$, wherein a is an integer from 1 to 4, b is an integer from 0 to 9, c is an integer from 0 to 9, and d is an integer from 1 to 10, provided that b+c+d equals 2a+2 for acyclic compounds and equals 2a for cyclic compounds and for olefinic compounds, comprising the step of:

contacting the impure hydrogen chloride with a sorbent for said impurities selected from the group consisting of activated carbons, inorganic silica molecular sieves, inorganic metalloaluminate molecular sieves and inorganic aluminophosphate molecular sieves at a temperature within the range of −20° C. to 300° C. and a pressure within the range of 10 kPa to 3000 kPa and for a period of time sufficient to reduce the mole fraction of impurity at least about 50%; provided that when said sorbent is an activated carbon the contact is at a temperature within the range of −20° C. to 100° C.

2. The process of claim 1 wherein the impure HCl contains 1 mole percent or less of said impurities.

3. The process of claim 1, wherein the impurity is selected from the group consisting of $CClF_2CF_3$ and $CHF_2CF_3$.

4. The process of claim 1, wherein the sorbent is an inorganic molecular sieve having an average pore size of from about 0.3 to 1.5 nm.

5. The process of claim 4 wherein the sorbent is a silicalite.

6. The process of claim 5 wherein the impurity is selected from the group consisting of $CClF_2CF_3$ and $CHF_2CF_3$.

7. The process of claim 3 wherein the sorbent is an activated carbon.

8. The process of claim 7 wherein the activated carbon contains at least one metal selected from the group consisting of lithium, sodium, potassium, rubidium, cesium, magnesium, calcium, strontium and barium.

9. The process of claim 7 wherein the impurity is selected from the group consisting of $CClF_2CF_3$ and $CHF_2CF_3$.

10. A process for purifying impure hydrogen chloride containing at least one saturated or olefinic impurity of the formula $C_aH_bCl_cF_d$, wherein a is an integer from 1 to 4, b is an integer from 0 to 9, c is an integer from 0 to 9, and d is an integer from 1 to 10, provided that b+c+d equals 2a+2 for acyclic compounds and equals 2a for cyclic compounds and for olefinic compounds, comprising the step of:

contacting the impure hydrogen chloride with a sorbent for said impurities selected from the group consisting of inorganic molecular sieves selected from silicas, metalloaluminates and aluminophosphates at a temperature within the range of −20° to 300° C. and a pressure within the range of 10 kPa to 3000 kPa and for a period of time sufficient to reduce the mole fraction of impurity at least about 50%.

11. The process of claim 10 wherein the impure hydrogen chloride is of at least 98 mole % purity.

12. The process of claim 11 wherein the inorganic molecular sieve has an average pore size of from about 0.3 to 20 nanometers.

13. The process of claim 11 wherein the inorganic molecular size has an average pore size of from about 0.3 to 1.5 nanometers.

14. The process of claim 12 wherein the inorganic molecular sieve has a Si:Al atomic ratio equal to or greater than 3.8:1.

15. The process of claim 12 wherein the inorganic molecular sieve is a silicalite.

16. The process of claim 12 wherein the impurity is selected from the group consisting of $CClF_2CF_3$ and $CHF_2CF_3$.

17. A process for purifying impure hydrogen chloride containing at least one saturated or olefinic impurity of the formula $C_aH_bCl_cF_d$, wherein a is an integer from 1 to 4, b is an integer from 0 to 9, c is an integer from 0 to 9, and d is an integer from 1 to 10, provided that b+c+d equals 2a+2 for acyclic compounds and equals 2a for cyclic compounds and for olefinic compounds, comprising the step of: contacting the impure hydrogen chloride with a sorbent for said impurities selected from the group consisting of activated carbons at a temperature within the range of −20° to about 100° C. and a pressure within the range of 10 kPa to 3000 kPa and for a period of time sufficient to reduce the mole fraction of impurity at least about 50%.

18. The process of claim 17 wherein the impure hydrogen chloride is of at least 98% purity.

19. The process of claim 18 wherein the impurity is selected from the group consisting of $CClF_2CF_3$ and $CHF_2CF_3$.

* * * * *